United States Patent [19]

Haessner geb. Michael et al.

[11] 4,360,587
[45] Nov. 23, 1982

[54] SILVER-FREE LIGHT-SENSITIVE MATERIAL

[75] Inventors: Carmen Haessner geb. Michael, Wolfen; Heinz Mustroph; Jörg Marx, both of Dessau, all of German Democratic Rep.

[73] Assignee: VEB Filmfabrik Wolfen, Wolfen, German Democratic Rep.

[21] Appl. No.: 291,659

[22] Filed: Aug. 10, 1981

[30] Foreign Application Priority Data

Oct. 3, 1980 [DD] German Democratic Rep. ... 224306

[51] Int. Cl.³ .............................................. G03C 1/52
[52] U.S. Cl. .................................. 430/332; 430/337; 430/344; 430/339
[58] Field of Search ............... 430/332, 344, 337, 338, 430/339, 225

[56] References Cited

U.S. PATENT DOCUMENTS 3,620,748  11/1971  Fichter ............................. 430/344

OTHER PUBLICATIONS

Winslow et al.=Color Imaging System, International Publication No. WO 81/01757, PCT, pp. 1–44.

Primary Examiner—Won H. Louie, Jr.
Attorney, Agent, or Firm—Jordan and Hamburg

[57] ABSTRACT

This invention relates to a radiation-sensitive, silver-free recording material for direct optical recording with high sensitivity, characterized by its exceptional resistance to light and heat and large solubility. This is achieved by the fact that the recording material contains as coloring substances, azo dyestuffs of the general formula

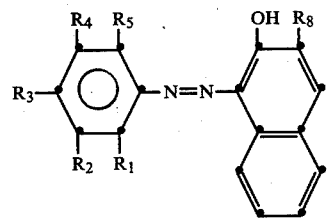

$R_1$, $R_2$, $R_3$, $R_4$, $R_5$ are the same or different and are halogen, alkoxy, alkyl, acetyl, amino; $R_8$ hydroxy, alkoxy or acetylamino. The material distinguishes itself by the different processing variations that are possible so that with a same basic type, it is possible to obtain pictures operating according to a positive principle as well as according to a negative principle.

31 Claims, No Drawings

SILVER-FREE LIGHT-SENSITIVE MATERIAL

BACKGROUND OF THE INVENTION AND PRIOR ART STATEMENT

This invention relates to a silver-free radiation-sensitive material for direct optical recordings.

Numerous processes which operate on the basis of perhalides and dyestuff precursors already exist (R. H. Spraque and coworkers: Phot. Sci. Eng. 5 98 (1961), 8 91 (1963), 8 95 (1965), A. Fotland. J. Phot. Sci. 18 33 (1970) DE-OS No. 2 241 563, DE-OS No. 2 055 872, DE-OS No. 2 142 966). All these processes involve color-promoting processes, i.e. dyestuffs are produced from dyestuff precursors and perhalides under the action of light after executing complicated chemical processes. The sensitivity of such systems can be increased by the addition of sensitizers (DE-OS No. 2 142 966).

Up to now, the most favorable material qualities have been attained with some spirobipyranes. However, these compounds also present some serious disadvantages, such as other compounds, for instance leucobases of the triarylmethane dyestuffs and styryl dyestuff bases. Here, the low resistance of most dyestuff bases to light and thermal influences should especially be considered. Furthermore, it is difficult to color over the whole visible spectrum with a dyestuff base. Last but not least, many dyestuffs or their precursors can only be produced through complicated, protracted syntheses.

It is the task of this invention to improve treatment qualities of silver-free recording materials.

The known materials for optical development have the disadvantage that they are spectrally limited and unstable and that the synthesis of dyestuff precursors is costly and complicated. It is, therefore, the task of the present invention to create a stable, silver-free recording material with high sensitivity and large dissolving capacity, whose coloring substances are easy to synthesize and present a wide spectrum of colors.

SUMMARY OF THE INVENTION

According to the present invention, this task is solved in that the silver-free, light-sensitive material for direct optical development comprising a color-providing substance, perhalides, sensitizers and fixing agents, contain as the coloring substance, azo dyestuffs of the general formula

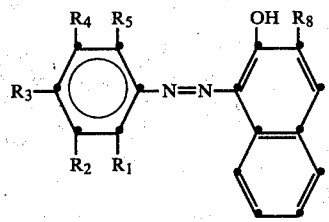

wherein
$R_1$, $R_2$, $R_3$, $R_4$, $R_5$ are the same or different and are are hydrogen, fluoro, chloro, iodo, bromo, hydroxy, nitro, cyano, alkyl with 1 to 6 carbon atoms, alkoxy with 1 to 6 carbon atoms, cyanoalkoxy with 1 to 4 carbon atoms, fluorinated alkoxy with 1 to 4 carbon atoms, acetyl, acetylamino, trifluoromethyl

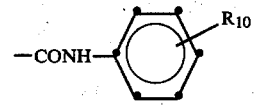

$R_6$, $R_7$ are the same or different and are alkyl with 1 to 6 carbon atoms, aralkyl, cyanoalkyl, hydroxyalkyl with 1 to 6 carbon atoms, the alkyl groups necessary for the completion of a 5- or 6-membered heterocyclic ring, wherein he ring may contain an additional hetero-atom, such as N, S, and O;

$R_8$ is hydrogen, hydroxy, alkoxy with 1 to 6 carbon atoms, —CONHR$_9$ $$-CONH-\bigcirc-R_{10}$$

—CONR$_{11}$R$_{12}$;

$R_9$ is alkyl with 1 to 6 carbon atoms, hydroxyalkyl with 1 to 6 carbon atoms, amino-alkyl with 1 to 6 carbon atoms;

$R_{10}$ is hydrogen, fluoro, chloro, bromo, iodo, nitro, cyano, acetyl, trifluoromethyl, alkyl with 1 to 6 carbon atoms, alkoxy with 1 to 6 carbon atoms;

$R_{11}$, $R_{12}$ are the same or different and are alkyl with 1 to 6 carbon atoms, aralkyl, the alkyl groups necessary for the completion of a 5- or 6-membered hetrocyclic ring, wherein the ring may contain an additional hetero-atom, such as N, S, or O.

DETAILED DESCRIPTION OF PREFERRED EMBODIMENTS

The azo dyestuffs used as coloring substances are produced in known manner from 2,3-hydroxynaphthoic acid derivatives and diazotized anilines through azo coupling in an alkaline solution.

Organic polyhalide compounds are used as reaction partners of the azo dyestuffs in the image-enhancing process from which a halogen-containing radical may be photolytically separated.

Examples of these compounds are organic halides, such as tetrabromocarbons, bromoform, iodoform, hexachloroethane, hexabromoethane, pentabromoethane, 1,1,2,2-tetrabromoethane, α,α,α-tribromoacetophenone and tribromoethanol. Preferably, tetrabromocarbons, iodoform and tribromoethanol are used alone or combined.

Sensitizers may be added in order to make the material more sensitive to the applied radiation. Michlers Ketone (p, p'dimethylaminobenzophenone) or analogous compounds are some compounds of this type that are utilized. Plasticizers, such as, for instance, diphenyl and/or dimethylformamide, may be added to the system to improve the qualities of the material. The radiation-sensitive substance, together with the azo dyestuff, the additives and a fixing agent are coated onto one of the conventional carriers, such as artificial material foils, paper, or glass. Several polymers, such as polyvinylchloride, polyvinylcarbazole and polyvinylacetate, polymeric mixtures or copolymers are appropriate fixing agents, depending on mode of processing and final application of the material. The thickness of the recording layer is variable, preferably 10 μm.

The processing of the material is accomplished in the following manner: The organic polyhalide compound is split into reactive radicals by illumination with the UV-rays of an extra high pressure mercury vapour lamp HBO. In the subsequent process, hydrogen halide acid is formed at the illuminated spots by the reaction of these radicals. This results in a conversion of the dyestuff, which is connected with a color change. The subsequent processing may be carried out in several variations.

Variation A

The polyhalide compound is removed and the image thereby stabilized through a brief heating of the material at temperatures >100° C. For this purpose, systems of different compositions are used with any desired fixing agents which should preferably contain tetrabromo carbon as the preponderant part of the polyhalide compounds. A two-colored picture with good contrast and good resolution is obtained in a positively operating process.

Variation B

Systems of differing compositions are fixed herein with various fixing agents except for polystyrene, and any desired polyhalide compounds so that the light-sensitive component is removed from the layer with the aid of solvents, such as, for example, petroleum ether, benzene, acetone, ethyl acetate or solvent mixtures. A two-colored picture with good contrast and high resolution is also obtained here.

Variation C

This processing variation is good for systems of any composition that may contain polystyrene as a fixing agent. As in B, solvents or solvent mixtures are used for fixation. A mixture of benzene, acetone and ethyl acetate is preferably used for this purpose. By means of the solvents used, it is possible to dissolve away not only the unexposed dyestuff introduced, but also the polyhalide compounds so that a negative process is thereby obtained. Pictures of high density having from yellow to red-brown color shades originate. The form of the original dyestuffs now present distinguishes itself by a high resistance to light and heat.

By a briefly-timed treatment with bases, for instance ammonia, it is possible to regain the original color at the illuminated spots. This also makes it possible to obtain blue color shades. The advantage of the material of this invention is that different ways of processing the same material lead to different final results; thus positive or negative images can be obtained. The material can be utilized for different application purposes, for instance, application as duplicates, test sheets, colorproof and intermediate originals in cartography; only the method of processing is changed. The dyestuffs employed distinguish themselves by their high resistance to light and heat, their color multiplicity and their easy manufacture. Sensitivity is the same as in the previously known printing materials having a perhalide base.

EXAMPLE 1

A radiation-sensitive material is produced by depositing the following composition on a polyethyleneterephthalate carrier not provided with an adhesive layer:

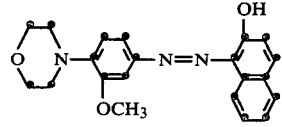

| 200 mg | $CBr_4$ |
|---|---|
| 200 mg | $CHI_3$ |
| 10 mg | Michlers Ketone |
| 10 ml | Polystyrene/$CH_2Cl_2$ solution (10%) |

The layer is dired for a short time at 50° C. The thickness of the layer is 6-8 μm. The material is illuminated with an extra high pressure mercury vapor lamp from a distance of 20 cm for 4 min. Thereafter, it is fixed for a short time in a mixture of acetone, ethyl acetate and benzene. A yellow-orange-colored image with an optical density of >1 is obtained.

EXAMPLE 2

The following material is produced as in Example 1:

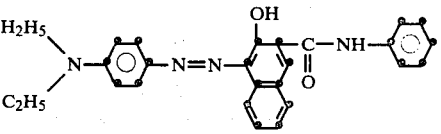

| 500 mg | CBr |
|---|---|
| 100 mg | $CHI_3$ |
| 10 mg | Michlers Ketone |
| 10 ml | polyvinylchloride/$CH_2Cl_2$ (10%). |

The material is illuminated with an extra high pressure mercury vapor lamp for 3 min., then fixed through storing at 120° C. A two-colored image is obtained; at the nonilluminated spots it is dark blue, λ=625 nm, and at the illuminated ones orange, λ=510 nm. The density of both dyestuffs forms is between 1.2 and 1.4.

EXAMPLE 3

A radiation-sensitive material is produced as in the previous example:

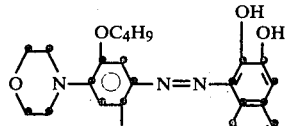

| 100 mg | $CHI_3$ |
|---|---|
| 300 mg | tribromoethanol |
| 10 mg | Michlers Ketone |
| 100 ml | polystyrene/$CH_2Cl_2$ (10%). |

Processing is carried out as in Example 1. The image obtained presents a redish-brown color shade.

EXAMPLE 4

The following layer is produced as in Example 1:

| | |
|---|---|
| 50 mg | [structure: morpholine-N-phenyl(OCH3)-N=N-naphthol] |
| 150 mg | [structure: (C2H5)2N-phenyl-N=N-naphthol-C(O)-NH-phenyl-OCH3] |

| | |
|---|---|
| 100 mg | DMF |
| 400 mg | CBr4 |
| 100 mg | CHI3 |
| 100 mg | diphenyl |
| 10 mg | Michlers Ketone |
| 10 ml | polystyrene (CH2Cl2). |

Processing can again here be carried out in several variations.

A: Illumination and subsequent fixation of the solvent as in Example 1. A redish-brown picture with high optical density is obtained.
B: The image obtained as per A is treated a few seconds with ammonia vapor. The final result is a very distinct dark violet picture.

EXAMPLE 5

The next system is produced by a previously described process:

| | |
|---|---|
| 200 mg | [structure: (C2H5)2N-phenyl-N=N-naphthol-C(O)-NH-phenyl-CH3] |

| | |
|---|---|
| 100 mg | DMF |
| 100 mg | diphenyl |
| 400 mg | CBr4 |
| 100 mg | CHI3 |
| 10 mg | Michlers Ketone |
| 10 mg | polystyrene [CH2Cl2—](10%). |

The processing can be carried out by several variations.
Variation A: as in Example 2.
The result is a two-colored picture, which is orange ($\lambda = 500$ nm) at the illuminated spots and blue ($\lambda = 610$ nm).
Variation B: as in Example 1
An orange-colored picture is obtained with a density of $>1.4$.
Variation C:
The material is initially processed here in a manner as indicated in Example 1. After fixation has been completed, brief treatment with ammonia follows (duration: a few seconds). The image obtained has a dark-blue color shade with a very high optical consistency.
The following Table (1) contains a selection of several examples. The materials are produced in a manner similar to Example 1.

TABLE 1

[Structure: phenyl ring with R3, R4, R5 substituents and R2, R1 substituents, connected via -N=N- to naphthol with OH and R8]

| | $R_1$ | $R_2$ | $R_3$ | $R_4$ | $R_8$ | Processing Variation | Color of Image | Optical density |
|---|---|---|---|---|---|---|---|---|
| (1) | —N⟨ (pyrrolidine) | — | — | —NO2 | —C(O)—NH—CH2CH2NH2 | B | yellow | 1.6 |
| (2) | — | —CH3 | — | —N⟨N (piperazine) | — | —C(O)—NH—CH2—N⟨ | A | red/blue | 1.2 |
| (3) | — | —OCH3 | —N(CH3)2 | —OCH3 | —C(O)—NH—phenyl-OH | C | blue | 1.4 |
| (4) | — | —OCH3 | —N⟨ (pyrrolidine) | — | —C(O)—NH—phenyl(NO2)(OCH3) | C | blue | 2.0 |
| (5) | — | — | —OCH3 | — | —C(O)—NH—phenyl(OCH3)2(Cl) | B | red brown | 1.6 |

TABLE 1-continued

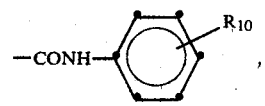

| R₁ | R₂ | R₃ | R₄ | R₈ | Processing Variation | Color of Image | Optical density |
|---|---|---|---|---|---|---|---|
| (6) | — | — | −N(C₂H₄OH)(C₂H₅) | — | −H | B | orange | 1.8 |
| (7) | — | — | −N(C₂H₄OH)(C₂H₅) | — | −C(=O)−NH−C₆H₄−OCH₃ | A | orange/blue | 1.5 |
| (8) | −OC₄H₉ | — | −N(morpholino) | −OC₄H₉ | −C(=O)−NH−C₆H₄−OCH₃ | C | blue | 2.0 |

The dyestuffs may further be used in any desired mixtures, which leads to multiple image colors.

We claim:

1. A silver-free, light sensitive composition, comprising an organic polyhalide compound capable of splitting into reactive radicals when exposed to ultraviolet rays, and an azo dyestuff of the general formula

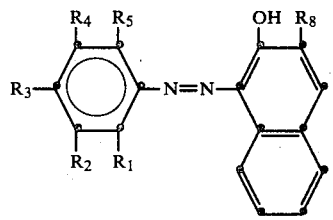

wherein

R₁, R₂, R₃, R₄, R₅ are the same or different and are hydrogen, fluoro, chloro, bromo, iodo, hydroxy, nitro, cyano, acetyl, acetylamino, trifluoromethyl, alkyl with 1 to 6 carbon atoms, alkoxy with 1 to 6 carbon atoms, cyanoalkoxy with 1 to 4 carbon atoms, fluorinated alkoxy with 1 to 4 carbon atoms,

R₆, R₇ are the same or different and are aralkyl, cyanoalkyl, alkyl with 1 to 6 carbon atoms, hydroxyalkyl with 1 to 6 carbon atoms, R₆ and R₇ together form a 5- or 6-membered heterocyclic ring or a 5- or 6-membered heterocyclic ring with an additional heteroatom, R₈ is hydrogen, hydroxy, alkoxy with 1 to 6 carbon atoms; —CONHR₉, $$-\text{CONH}-\text{C}_6\text{H}_4-\text{R}_{10}$$

—CONR₁₁R₁₂;

R₉ is alkyl with 1 to 6 carbon atoms, hydroxyalkyl with 1 to 6 carbon atoms, aminoalkyl with 1 to 6 carbon atoms, R₁₀ is hydrogen, fluoro, chloro, bromo, iodo, nitro, cyano, acetyl, trifluoromethyl, alkyl with 1 to 6 carbon atoms, alkoxy with 1 to 6 carbon atoms, R₁₁, R₁₂ are the same or different and are alkyl with 1 to 6 carbon atoms, aralkyl, R₁₁ and R₁₂ together form a 5- or 6-membered heterocyclic ring, or a 5- or 6-membered heterocyclic ring with an additional heteroatom.

2. The composition of claim 1 wherein the azo dyestuff is of the formula

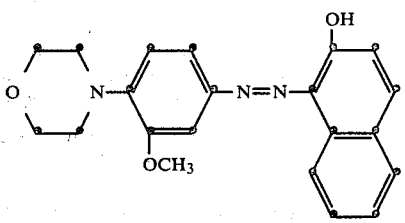

3. The composition of claim 1 wherein the azo dyestuff is of the formula

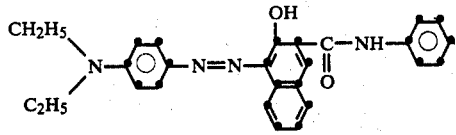

4. The composition of claim 1 wherein the azo dyestuff is of the formula

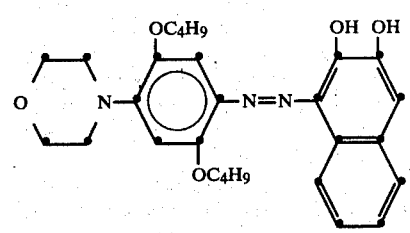

5. The composition of claim 1 wherein the azo dyestuff is of the formula

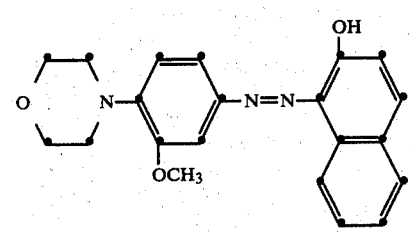

6. The composition of claim 1 wherein the azo dyestuff is of the formula

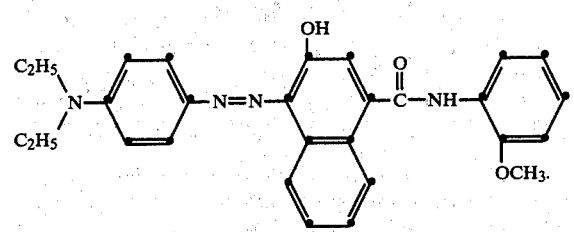

7. The composition of claims 5 or 6, wherein the azo dyestuff comprises a mixture of the azo dyestuffs of claim 5 and of claim 6.

8. The composition of claim 1 wherein the azo dyestuff is of the formula

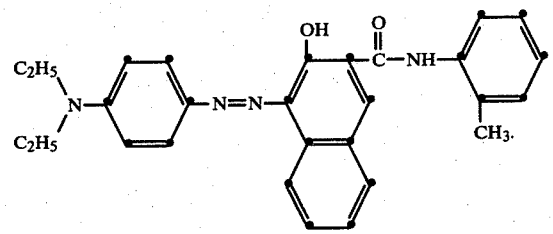

9. The composition of claim 1 wherein

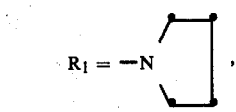

$R_2$=hydrogen, $R_3$=hydrogen, $R_4$=—NO$_2$, $R_5$=hydrogen, and

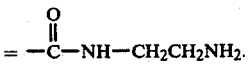

10. The composition of claim 1 wherein $R_1$=hydrogen, $R_2$=—CH$_3$,

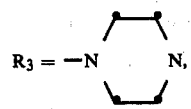

$R_4$=hydrogen, $R_5$=hydrogen, and

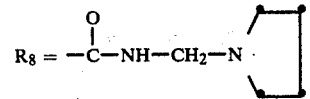

11. The composition of claim 1 wherein $R_1$=hydrogen, $R_2$=—OCH$_3$,

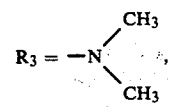

$R_4$=—OCH$_3$, $R_5$=hydrogen, and

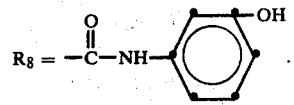

12. The composition of claim 1 wherein $R_1$=hydrogen, $R_2$=—OCH$_3$,

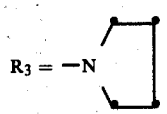

$R_4$=hydrogen, $R_5$=hydrogen, and

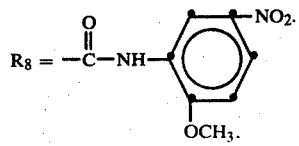

13. The composition of claim 1 wherein $R_1$=hydrogen, $R_2$=hydrogen, $R_3$=—OCH$_3$, $R_4$=hydrogen, $R_5$=hydrogen, and

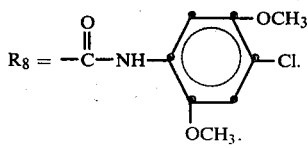

14. The composition of claim 1 wherein $R_1$=hydrogen, $R_2$=hydrogen,

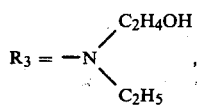

$R_4$=hydrogen, $R_5$=hydrogen, and $R_8$=hydrogen.

15. The composition of claim 1 wherein $R_1$=hydrogen, $R_2$=hydrogen,

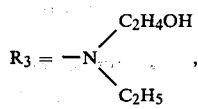

$R_4$=hydrogen, $R_5$=hydrogen, and

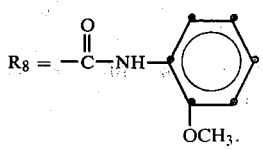

16. The composition of claim 1 wherein $R_1$=—OC$_4$H$_9$, $R_2$=hydrogen,

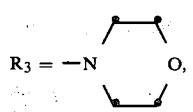

$R_4$=—OC$_4$H$_9$, $R_5$=hydrogen, and

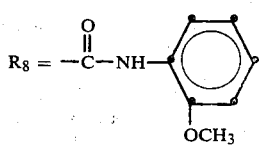

17. The composition of claim 1 additionally comprising a component selected from the group consisting of sensitizers, fixing agents, plasticizers, and mixtures thereof.

18. The composition of claim 17 wherein the sensitizer is p, p'-dimethylamino benzophenone.

19. The composition of claim 17 wherein the plasticizer is selected from the group consisting of diphenylformamide, dimethylformamide, and mixtures thereof.

20. The composition of claim 17 wherein the fixing agent is selected from the polymeric mixtures or copolymers of polyvinylchloride, polyvinylcarbazole, polyvinylacetate, and mixtures thereof.

21. The composition of claim 1 wherein said organic polyhalide compound is selected from the group consisting of tetrabromocarbons, bromoform, iodoform, hexachloroethane, α,α,α-tribromoacetophenone, tribromoethanol, and mixtures thereof.

22. The composition of claim 21 wherein the organic halide is selected from the group of tetrabromocarbons, iodoform, tribromoethanol and mixtures thereof.

23. A process for producing an image, comprising coating the composition of claim 1 onto a substrate and imagewise exposing said composition to ultraviolet rays to split the organic polyhalide compound into reactive radicals, thereby forming an image.

24. The process of claim 23 comprising the subsequent step of heating said silver-free photosensitive composition composition at greater than 100° C. to remove unreacted organic polyhalide compound, thereby stabilizing said image.

25. The process of claim 24 wherein said organic polyhalide compound is a tetrabromocarbon.

26. The process of claim 23 comprising the subsequent step of removing unexposed silver free light-sensitive composition with a solvent in the absence of polystyrene.

27. The process of claim 26 wherein the solvent is selected from the group consisting of petroleum ether, benzene, acetone, ethyl acetate, and mixtures thereof.

28. The process of claim 23 comprising the subsequent step of removing unexposed silver-free light-sensitive composition and unreacted organic polyhalide compounds with a solvent in the presence of polystyrene.

29. The process of claim 28 wherein the solvent is selected from the group consisting of benzene, acetone, ethyl acetate, and mixtures thereof.

30. The process of claims 24, 26, or 28, comprising the additional step of treatment with a base.

31. The process of claim 30 wherein the base is ammonia.

* * * * *